United States Patent
Tu et al.

(10) Patent No.: US 11,288,458 B2
(45) Date of Patent: Mar. 29, 2022

(54) SEQUENCE CONVERSION METHOD AND APPARATUS IN NATURAL LANGUAGE PROCESSING BASED ON ADJUSTING A WEIGHT ASSOCIATED WITH EACH WORD

(71) Applicant: HUAWEI TECHNOLOGIES CO., LTD., Guangdong (CN)

(72) Inventors: Zhaopeng Tu, Shenzhen (CN); Xiaohua Liu, Shenzhen (CN); Zhengdong Lu, Shenzhen (CN); Hang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 208 days.

(21) Appl. No.: 16/276,627

(22) Filed: Feb. 15, 2019

(65) Prior Publication Data

US 2019/0179905 A1 Jun. 13, 2019

Related U.S. Application Data (63) Continuation of application No. PCT/CN2017/078096, filed on Mar. 24, 2017.

(30) Foreign Application Priority Data

Aug. 19, 2016 (CN) .......................... 201610698139.7

(51) Int. Cl.
*G10L 15/16* (2006.01)
*G10L 15/22* (2006.01)
(Continued)

(52) U.S. Cl.
CPC ............ *G06F 40/30* (2020.01); *G06F 40/268* (2020.01); *G06F 40/289* (2020.01); *G06F 40/44* (2020.01)

(58) Field of Classification Search
CPC ......... G10L 15/16; G10L 15/22; G10L 15/30; G16H 50/20; G06F 3/167
(Continued)

(56) References Cited

U.S. PATENT DOCUMENTS

| 9,263,036 B1 * | 2/2016 | Graves .................... G10L 15/16 |
| 2003/0014379 A1 | 1/2003 | Saias et al. |

(Continued)

FOREIGN PATENT DOCUMENTS

| CN | 102314418 A | 1/2012 |
| CN | 104391842 A | 3/2015 |

(Continued)

OTHER PUBLICATIONS

"Sequence Transduction with Recurrent Neural Networks" in Representation Learning Workshop, International Conference on Machine Learning (ICML 2012).*

(Continued)

*Primary Examiner* — Farzad Kazeminezhad (57) ABSTRACT

The present application relates to natural language processing and discloses a sequence conversion method. The method includes: obtaining a source sequence from an input signal; converting the source sequence into one or more source context vectors; obtaining a target context vector corresponding to each source context vector; combining the target context vectors to obtain the target sequence; and outputting the target sequence. A weight vector is applied on a source context vector and a reference context vector, to obtain a target context vector, wherein the weight of one or more elements in the source context vector associated with notional words or weight of a function word in the target context vector is increased. The source sequence and the target sequence are representations of natural language (Continued)

contents. The claimed process improves faithfulness of converting the source sequence to the target sequence.

20 Claims, 5 Drawing Sheets

(51) Int. Cl.
<table>
<tr><td>G06F 3/16</td><td>(2006.01)</td></tr>
<tr><td>G10L 15/30</td><td>(2013.01)</td></tr>
<tr><td>G06F 40/30</td><td>(2020.01)</td></tr>
<tr><td>G06F 40/44</td><td>(2020.01)</td></tr>
<tr><td>G06F 40/268</td><td>(2020.01)</td></tr>
<tr><td>G06F 40/289</td><td>(2020.01)</td></tr>
</table>

(58) Field of Classification Search
USPC .......................................... 315/130; 250/554
See application file for complete search history.

(56) References Cited

U.S. PATENT DOCUMENTS

<table>
<tr><td>2005/0187845 A1</td><td>8/2005</td><td>Eklund et al.</td></tr>
<tr><td>2006/0136193 A1</td><td>6/2006</td><td>Lux-Pogodalla et al.</td></tr>
<tr><td>2012/0303564 A1</td><td>11/2012</td><td>Dobson et al.</td></tr>
<tr><td>2017/0177812 A1*</td><td>6/2017</td><td>Sjolund .................. G16H 50/20</td></tr>
</table>

FOREIGN PATENT DOCUMENTS

<table>
<tr><td>CN</td><td>104809107 A</td><td>7/2015</td></tr>
<tr><td>CN</td><td>104951791 A</td><td>9/2015</td></tr>
<tr><td>CN</td><td>105068998 A</td><td>11/2015</td></tr>
<tr><td>CN</td><td>105740909 A</td><td>7/2016</td></tr>
<tr><td>CN</td><td>105808530 A</td><td>7/2016</td></tr>
<tr><td>CN</td><td>105808711 A</td><td>7/2016</td></tr>
<tr><td>CN</td><td>105868184 A</td><td>8/2016</td></tr>
<tr><td>EP</td><td>0810533 A2</td><td>12/1997</td></tr>
</table>

OTHER PUBLICATIONS

Zhaopeng Tu et al, "Modeling Coverage for Neural Machine Translation", ACL 2016, Aug. 6, 2016, 11 pages.

Heeyoul Choi et al, "Context-Dependent Word Representation for Neural Machine Translation", arXiv, Jul. 3, 2016, 13 pages.

Wei He et al, "Improved Neural Machine Translation with SMT Features", Proceedings of the Thirtieth AAAI Conference on Artificial Intelligence (AAAI-16), 2016, 7 pages.

Bumkyu Cho et al, "Zagier duality for harmonic weak Maass forms of integral weight", Proceedings of the American Mathematical Society, vol. 139, No. 3, Oct. 27, 2010, 11 pages.

Xiao He et al, "Neural language model and semantic compositionality model in semantic similarity", Computer Engineering and Applications, 2016, vol. 52, No. 7, Dec. 11, 2014, 5 pages.

Notice of Allowance issued in CN 201610698139.7 dated Mar. 3, 2021, 4 pages.

* cited by examiner

SEQUENCE CONVERSION METHOD AND APPARATUS IN NATURAL LANGUAGE PROCESSING BASED ON ADJUSTING A WEIGHT ASSOCIATED WITH EACH WORD

CROSS-REFERENCE TO RELATED APPLICATIONS

This application is a continuation of International Application No. PCT/CN2017/078096, filed on Mar. 24, 2017, which claims priority to Chinese Patent Application No. 201610698139.7, filed on Aug. 19, 2016. The disclosures of the aforementioned applications are hereby incorporated by reference in their entireties.

TECHNICAL FIELD

The present disclosure generally relates to computer technologies. In particular, the present disclosure relates to natural language processing, and pertains to converting a sequence representing a language-related content into another semantically similar sequence.

BACKGROUND

With rapid development of computer technologies, researches on deep learning have made great progress, and, in natural language processing, breakthroughs have been made in sequence-to-sequence learning. The sequence-to-sequence learning is a learning process of mapping a source sequence to a target sequence. Results of the sequence-to-sequence learning are used for sequence conversion. Typical application scenarios of the sequence conversion include machine translation, speech recognition, dialog system or conversational agent, automatic summarization, question answering, image caption generation, etc.

A typical sequence conversion process includes two stages: encoding stage and decoding stage. In the encoding stage, a source sequence is converted into a vector (also referred to as a source context vector) through a recurrent neural network (RNN). By using an attention mechanism, a part of the source sequence is selected each time and converted into a source context vector. That is, the source sequence is converted into multiple source context vectors. In other words, a corresponding source context vector is generated for each target word of the target sequence. In the decoding stage, a target sequence is generated in a manner of generating one word each time. In each step, a decoder calculates an intermediate state of the decoder in a current step according to a current source context vector obtained in the encoding stage and a target context vector (including an intermediate state of the decoder in a previous step and a target word generated in the previous step) of the decoder. The decoder predicts a target word in the current step according to the intermediate state and the source context vector. An intermediate state of the decoder and a target word that are newly generated are a new target context vector at a current moment.

When the sequence conversion method is applied to the natural language processing, the RNN may be used for processing in the decoding stage because lengths of the source sequence and the target sequence are unfixed.

During prediction, the RNN uses a target context vector already obtained by means of prediction as a main reference, and uses a source context vector only as an extra input. Consequently, information corresponding to a current source context vector cannot possibly be correctly transmitted to a corresponding target context vector, and further a target sequence obtained by means of prediction cannot faithfully reflect information about a source sequence.

SUMMARY

Embodiments of the present disclosure provide a sequence conversion method and apparatus, so as to provide more accurate conversion of a source sequence to a target sequence.

In a first aspect of the present disclosure, a sequence conversion method is provided. The method includes:
  obtaining a source sequence;
  obtaining a reference context vector;
  converting the source sequence into a source context vector;
  obtaining a weight vector according to the reference context vector and the source context vector;
  weighting the source context vector and the reference context vector by using the weight vector;
  predicting, by using a weighted source context vector and a weighted reference context vector, a target context vector corresponding to the source context vector; and
  obtaining a target sequence according to the target context vector.

With reference to the first aspect, in a first implementation of the first aspect, when the target context vector is the first target context vector corresponding to the source sequence, the reference context vector is an initial target context vector. A value of each element in the initial target context vector is zero, so as to avoid interference on prediction of a current source context vector. When the target context vector is not the first target context vector corresponding to the source sequence, the reference context vector is an obtained target context vector. In an implementation, the obtained target context vector may be a previously obtained target context vector. Using the obtained target context vector can further improve faithfulness of the target sequence to the source sequence, and improve smoothness of the target sequence.

With reference to the first implementation of the first aspect, in a second implementation of the first aspect, the method further includes:
  updating the reference context vector by using the target context vector corresponding to the source context vector. In this way, the target context vector can influence prediction of a next target context vector, thereby further improving faithfulness of the target sequence to the source sequence, and improving smoothness of the target sequence.

With reference to at least one of the first aspect, the first implementation of the first aspect, or the second implementation of the first aspect, in a third implementation of the first aspect, the obtaining a weight vector according to the reference context vector and the source context vector includes: obtaining the weight vector by using the following equation:

$$z_i = \sigma(W_z e(y_{i-1}) + U_z s_{i-1} + C_z c_i)$$

where $z_i$ is the weight vector, $\sigma$ is an activation function, $e(y_{i-1})$ is a word vector in the reference context vector, $s_{i-1}$ is an intermediate state in the reference context vector, $c_i$ is the source context vector, $W_z$, $U_z$, and $C_z$ are module parameters of the activation function $\sigma$, i represents a sequence number of a vector, and the activation function $\sigma$ may be a sigmoid function used by a neuron.

With reference to the third implementation of the first aspect, in a fourth implementation of the first aspect, the module parameters $W_z$, $U_z$, and $C_z$ are obtained by learning from training data. $W_z$, $U_z$, and $C_z$ may be specifically obtained by maximizing a likelihood value of a target sequence in the training data, and a specific expression form of the training data may be a training sequence pair.

With reference to the third or the fourth implementation of the first aspect, in a fifth implementation of the first aspect, the activation function is a sigmoid function $$f(z) = \frac{1}{1+\exp(-z)}.$$

A sigmoid function is a function frequently used by a neural network/neuron.

With reference to the fifth implementation of the first aspect, in a sixth implementation of the first aspect, the module parameters $W_z$, $U_z$, and $C_z$ are obtained by maximizing a likelihood value of a target sequence in a training sequence pair, and are specifically obtained by training by using the following training function:

$$\operatorname*{argmax}_{W_z, U_z, C_z, P} \sum_{n=1}^{N} \log p(Y_n \mid X_n)$$

where N is a quantity of training sequence pairs in a training sequence set, $X_n$ is a source sequence in a training sequence pair, $Y_n$ is a target sequence in a training sequence pair, P is a parameter of a sequence conversion apparatus, the sequence conversion apparatus is configured to execute the training function, and specifically, the sequence conversion apparatus may be a neuron.

With reference to at least one of the first aspect, or the first to the sixth implementations of the first aspect, in a seventh implementation of the first aspect, a dimension of the weight vector is the same as a dimension of the target context vector. In some embodiments of the present disclosure, the dimension of the weight vector may be the same as a dimension of the source context vector. In some other embodiments, the dimension of the weight vector may also be different from those of the source context vector and the target context vector. When the dimensions of the weight vector is different from those of the source context vector/the target context vector, dimensions of the weight vector, the source context vector, and the reference context vector may be made consistent in a matrix conversion manner before weighting is performed. Therefore, it can be ensured that each element in the source context vector and the reference context vector has a corresponding weight, and accuracy of a final prediction result is ensured.

With reference to at least one of the first aspect, or the first to the seventh implementations of the first aspect, in an eighth implementation of the first aspect, each element in the weight vector is a real number greater than 0 and less than 1.

With reference to at least one of the first aspect, or the first to the eighth implementations of the first aspect, in a ninth implementation of the first aspect, the predicting, by using a weighted source context vector and a weighted reference context vector, a target context vector corresponding to the source context vector includes:

obtaining, by means of prediction by using the following function, the target context vector corresponding to the source context vector:

$$s_i = f((1-z_i)\{We(y_{i-1}) + Us_{i-1}\} + z_i Cc_i)$$

where $s_i$ is the target context vector corresponding to the source context vector, f is an activation function, $e(y_{i-1})$ is the word vector in the reference context vector, $s_{i-1}$ is the intermediate state in the reference context vector, $z_i$ is the weight vector, $c_i$ is the source context vector, W, U, and C are module parameters of the activation function f, i represents a sequence number of a vector, and the activation function f may be a sigmoid function used by a neuron.

With reference to at least one of the first aspect, or the first to the ninth implementations of the first aspect, in a tenth implementation of the first aspect, the source sequence is natural language text, and the target sequence is another natural language text;

the source sequence is human speech content, and the target sequence is natural language text corresponding to the speech content;

the source sequence is human speech content, and the target sequence is a speech response to the human speech content;

the source sequence is to-be-summarized natural language text, the target sequence is a summary of the to-be-summarized natural language text, and the summary is natural language text; or the source sequence is an image, and the target sequence is a natural language caption of the image.

A second aspect of the present disclosure provides a sequence conversion apparatus, including:

a source sequence obtaining unit, configured to obtain a source sequence;

a vector obtaining unit, configured to obtain a reference context vector;

a sequence conversion unit, configured to convert the source sequence into a source context vector;

a weight vector obtaining unit, configured to obtain a weight vector according to the reference context vector and the source context vector;

a weighting unit, configured to weight the source context vector and the reference context vector by using the weight vector;

a prediction unit, configured to predict, by using a weighted source context vector and a weighted reference context vector, a target context vector corresponding to the source context vector; and a target sequence obtaining unit, configured to obtain a target sequence according to the target context vector.

With reference to the second aspect, in a first implementation of the second aspect, when the target context vector is the first target context vector corresponding to the source sequence, the reference context vector is an initial target context vector. In an implementation, a value of each element in the initial target context vector is zero, so as to avoid interference on prediction of a current source context vector. When the target context vector is not the first target context vector corresponding to the source sequence, the reference context vector is an obtained target context vector. In an implementation, the obtained target context vector may be a previously obtained target context vector. Using the obtained target context vector can further improve faithfulness of the target sequence to the source sequence, and improve smoothness of the target sequence.

With reference to the first implementation of the second aspect, in a second implementation of the second aspect, the apparatus further includes:

an update unit, configured to update the reference context vector by using the target context vector corresponding to the source context vector. In this way, the target context vector can influence prediction of a next target context vector, thereby further improving faithfulness of the target sequence to the source sequence, and improving smoothness of the target sequence.

With reference to at least one of the second aspect, the first implementation of the second aspect, or the second implementation of the second aspect, in a third implementation of the second aspect, the weight vector obtaining unit obtains the weight vector by using the following equation:

$$z_i = \sigma(W_z e(y_{i-1}) + U_z s_{i-1} + C_z c_i)$$

where $z_i$ is the weight vector, $\sigma$ is an activation function, $e(y_{i-1})$ is a word vector in the reference context vector, $s_{i-1}$ is an intermediate state in the reference context vector, $c_i$ is the source context vector, $W_z$, $U_z$, and $C_z$ are module parameters of the activation function $\sigma$, i represents a sequence number of a vector, and the activation function $\sigma$ may be a sigmoid function used by a neuron.

With reference to the third implementation of the second aspect, in a fourth implementation of the second aspect, the module parameters $W_z$, $U_z$, and $C_z$ are obtained by learning from training data. $W_z$, $U_z$, and $C_z$ may be specifically obtained by maximizing a likelihood value of a target sequence in the training data, and a specific expression form of the training data may be a training sequence pair.

With reference to the third or the fourth implementation of the second aspect, in a fifth implementation of the second aspect, the activation function is a sigmoid function $$f(z) = \frac{1}{1 + \exp(-z)}.$$

A sigmoid function is a function frequently used by a neural network/neuron.

With reference to the fifth implementation of the second aspect, in a sixth implementation of the second aspect, the apparatus further includes:

a training unit, configured to obtain the module parameters $W_z$, $U_z$, and $C_z$ by maximizing a likelihood value of a target sequence in a training sequence pair, and specifically obtain the module parameters by training by using the following training function:

$$\underset{W_z, U_z, C_z, P}{\operatorname{argmax}} \sum_{n=1}^{N} \log p(Y_n | X_n)$$

where N is a quantity of training sequence pairs in a training sequence set, $X_n$ is a source sequence in a training sequence pair, $Y_n$ is a target sequence in a training sequence pair, and P is a parameter of the training unit. Specifically, when the training unit is implemented by using a neuron, P may be a parameter of the neuron.

With reference to at least one of the second aspect, or the first to the sixth implementations of the second aspect, in a seventh implementation of the second aspect, a dimension of the weight vector is the same as a dimension of the target context vector. In some embodiments of the present disclosure, the dimension of the weight vector may be the same as a dimension of the source context vector. In some other embodiments, the dimension of the weight vector may also be different from those of the source context vector and the target context vector. When the dimensions of the weight vector is different from those of the source context vector/the target context vector, dimensions of the weight vector, the source context vector, and the reference context vector may be made consistent in a matrix conversion manner before weighting is performed. Therefore, it can be ensured that each element in the source context vector and the reference context vector has a corresponding weight, and accuracy of a final prediction result is ensured.

With reference to at least one of the second aspect, or the first to the seventh implementations of the second aspect, in an eighth implementation of the second aspect, each element in the weight vector is a real number greater than 0 and less than 1.

With reference to at least one of the second aspect, or the first to the eighth implementations of the second aspect, in a ninth implementation of the second aspect, the prediction unit obtains, by means of prediction by using the following function, the target context vector corresponding to the source context vector:

$$s_i = f((1-z_i)\{We(y_{i-1}) + Us_{i-1}\} + z_i Cc_i)$$

where $s_i$ is the target context vector corresponding to the source context vector, f is an activation function, $e(y_{i-1})$ is the word vector in the reference context vector, $s_{i-1}$ is the intermediate state in the reference context vector, $z_i$ is the weight vector, $c_i$ is the source context vector, W, U, and C are module parameters of the activation function f, i represents a sequence number of a vector, and the activation function f may be a sigmoid function used by the neuron.

With reference to at least one of the second aspect, or the first to the ninth implementations of the second aspect, in a tenth implementation of the second aspect, the source sequence is natural language text, and the target sequence is another natural language text;

the source sequence is human speech content, and the target sequence is natural language text corresponding to the speech content;

the source sequence is human speech content, and the target sequence is a speech response to the human speech content;

the source sequence is to-be-summarized natural language text, the target sequence is a summary of the to-be-summarized natural language text, and the summary is natural language text; or the source sequence is an image, and the target sequence is a natural language caption of the image.

According to a third aspect of the present disclosure, a sequence conversion apparatus is provided and includes a processor and a memory, where the memory stores an executable instruction, and the executable instruction is used to instruct the processor to perform the following steps:

obtaining a source sequence;

obtaining a reference context vector;

converting the source sequence into a source context vector;

obtaining a weight vector according to the reference context vector and the source context vector;

weighting the source context vector and the reference context vector by using the weight vector;

predicting, by using a weighted source context vector and a weighted reference context vector, a target context vector corresponding to the source context vector; and obtaining a target sequence according to the target context vector.

With reference to the third aspect, in a first implementation of the third aspect, when the target context vector is the first target context vector corresponding to the source sequence, the reference context vector is an initial target context vector. In an implementation, a value of each element in the initial target context vector is zero, so as to avoid interference on prediction of a current source context vector. When the target context vector is not the first target context vector corresponding to the source sequence, the reference context vector is an obtained target context vector. In an implementation, the obtained target context vector may be a previously obtained target context vector. Using the obtained target context vector can further improve faithfulness of the target sequence to the source sequence, and improve smoothness of the target sequence.

With reference to the first implementation of the third aspect, in a second implementation of the third aspect, the processor is further configured to:

update the reference context vector by using the target context vector corresponding to the source context vector. In this way, the target context vector can influence prediction of a next target context vector, thereby further improving faithfulness of the target sequence to the source sequence, and improving smoothness of the target sequence.

With reference to at least one of the third aspect, the first implementation of the third aspect, or the second implementation of the third aspect, in a third implementation of the third aspect, the obtaining a weight vector according to the reference context vector and the source context vector includes:

obtaining the weight vector by using the following equation:

$$z_i = \sigma(W_z e(y_{i-1}) + U_z s_{i-1} + C_z c_i)$$

where $z_i$ is the weight vector, $\sigma$ is an activation function, $e(y_{i-1})$ is a word vector in the reference context vector, $s_{i-1}$ is an intermediate state in the reference context vector, $c_i$ is the source context vector, $W_z$, $U_z$, and $C_z$ are module parameters of the activation function $\sigma$, i represents a sequence number of a vector, and the activation function $\sigma$ may be a sigmoid function used by a neuron.

With reference to the third implementation of the third aspect, in a fourth implementation of the third aspect, the module parameters $W_z$, $U_z$, and $C_z$ are obtained by learning from training data. $W_z$, $U_z$, and $C_z$ may be specifically obtained by maximizing a likelihood value of a target sequence in the training data, and a specific expression form of the training data may be a training sequence pair.

With reference to the third or the fourth implementation of the third aspect, in a fifth implementation of the third aspect, the activation function is a sigmoid function $$f(z) = \frac{1}{1 + \exp(-z)}.$$

A sigmoid function is a function frequently used by a neural network/neuron.

With reference to the fifth implementation of the third aspect, in a sixth implementation of the third aspect, the processor is further configured to obtain the module parameters $W_z$, $U_z$, and $C_z$ by maximizing a likelihood value of a target sequence in a training sequence pair, and specifically obtain the module parameters by training by using the following training function:

$$\underset{W_z, U_z, C_z, P}{\operatorname{argmax}} \sum_{n=1}^{N} \log p(Y_n \mid X_n)$$

where N is a quantity of training sequence pairs in a training sequence set, $X_n$ is a source sequence in a training sequence pair, $Y_n$ is a target sequence in a training sequence pair, and P is a parameter of a module/apparatus that executes the training unit. For example, when the training unit is implemented by using a neuron, P may be a parameter of the neuron.

With reference to at least one of the third aspect, or the first to the sixth implementations of the third aspect, in a seventh implementation of the third aspect, a dimension of the weight vector is the same as a dimension of the target context vector. In some embodiments of the present disclosure, the dimension of the weight vector may be the same as a dimension of the source context vector. In some other embodiments, the dimension of the weight vector may also be different from those of the source context vector and the target context vector. When the dimensions of the weight vector is different from those of the source context vector/the target context vector, dimensions of the weight vector, the source context vector, and the reference context vector may be made consistent in a matrix conversion manner before weighting is performed. Therefore, it can be ensured that each element in the source context vector and the reference context vector has a corresponding weight, and accuracy of a final prediction result is ensured.

With reference to at least one of the third aspect, or the first to the seventh implementations of the third aspect, in an eighth implementation of the third aspect, each element in the weight vector is a real number greater than 0 and less than 1.

With reference to at least one of the third aspect, or the first to the eighth implementations of the third aspect, in a ninth implementation of the third aspect, the predicting, by using a weighted source context vector and a weighted reference context vector, a target context vector corresponding to the source context vector includes:

obtaining, by means of prediction by using the following function, the target context vector corresponding to the source context vector:

$$s_i = f((1-z_i)\{We(y_{i-1}) + Us_{i-1}\} + z_i C c_i)$$

where $s_i$ is the target context vector corresponding to the source context vector, f is an activation function, $e(y_{i-1})$ is the word vector in the reference context vector, $s_{i-1}$ is the intermediate state in the reference context vector, $z_i$ is the weight vector, $c_i$ is the source context vector, W, U, and C are module parameters of the activation function f, i represents a sequence number of a vector, and the activation function f may be a sigmoid function used by a neuron.

With reference to at least one of the third aspect, or the first to the ninth implementations of the third aspect, in a tenth implementation of the third aspect, the source sequence is natural language text, and the target sequence is another natural language text;

the source sequence is human speech content, and the target sequence is natural language text corresponding to the speech content;

the source sequence is human speech content, and the target sequence is a speech response to the human speech content;

the source sequence is to-be-summarized natural language text, the target sequence is a summary of the to-be-summarized natural language text, and the summary is natural language text; or the source sequence is an image, and the target sequence is a natural language caption of the image.

It can be learned from the foregoing technical solutions provided in the embodiments of the present disclosure that, during sequence conversion, a weight vector is obtained according to the reference context vector and the source context vector, and the source context vector and the reference context vector are weighted by using the weight vector. Therefore, a target context vector corresponding to a source context vector is predicated by using a weighted source context vector and a weighted reference context vector. Therefore, weights of the source context vector and the reference context vector can be dynamically determined according to a status of the source sequence, so that the target context vector obtained by means of prediction can be more faithful to the source context vector, and the final target sequence can be more faithful to the source sequence. Faithfulness of the target sequence to the source sequence is improved while smoothness of the target sequence is ensured.

BRIEF DESCRIPTION OF DRAWINGS

The following briefly describes the accompanying drawings used in describing the embodiments.

DESCRIPTION OF EMBODIMENTS

The following describes the technical solutions in the embodiments of the present disclosure with reference to the accompanying drawings.

The embodiments of the present disclosure provide a sequence conversion method, which may be used in any application scenarios requiring sequence conversion, for example, machine translation, speech recognition, dialog systems, automatic summarization, question answering, and image caption generation.

Machine translation (MT) belongs to computational linguistics, and it studies translation of text or speech from one natural language to another by a computer program. Natural language is a language that evolves naturally with culture. For example, English, Chinese, French, Spanish, and Japanese are all natural languages. A natural language content may be manually entered into a computing device by a user using manual input means such as a keyboard, a mouse, a touchscreen device, or a handwriting tablet; or the natural language content may be entered into the computing device by a remote device through a network. An output natural language content may be directly presented by a display unit, or may be output to a remote device via a network, and then presented by the remote device.

Speech recognition is to convert human speech content into natural language text by using a computer. Human speech content may be collected and then entered the computer by a sound collection device such as a microphone, or the human speech content may be collected by a remote device and then entered the computer by using a network. Output natural language text may be directly presented by a display unit, or may be output to a remote device by using a network and then presented by the remote device.

In a dialog system, a speech dialog is made between a computer and human. Human speech content is entered and a speech response corresponding to the entered speech content is output. The human speech content may be collected and then entered by a sound collection device such as a microphone, or may be collected by a remote device and then entered by using a network. The output speech response may be directly presented by a voice play device such as a speaker, or may be output to a remote device by using a network and then presented by the remote device.

Question answering is to answer a human speech question by using a computer. Input and output of question answering may be similar to those of a dialog system, and details are not described herein again.

Application scenarios of mainstream commercial speech assistants include speech recognition, dialog system, question answering, and the like.

Automatic summarization is to generate a summary of a piece of natural language text by using a computer, and is often used for providing a summary of an article in a known field, for example, generating a summary of an article published on a newspaper. The natural language text may be manually entered into the computer by a user using a manual input device such as a keyboard, a mouse, a touchscreen, or a handwriting tablet. The natural language text may be entered into the computer by a remote device via a network, or may be recognized and entered into the computer by using an optical character recognition (OCR) technology. An output summary includes natural language text, and may be directly presented by a display or may be output to a remote device by using a network and presented by the remote device.

Image caption generation is to generate a caption of an image by using a computer. An image may be collected by a remote device and then entered the computer by using a network, or may be collected and entered by an image capture device such as a camera. An output caption includes natural language text, and may be directly presented by a display or may be output to a remote device via a network and presented by the remote device.

Figure 1:
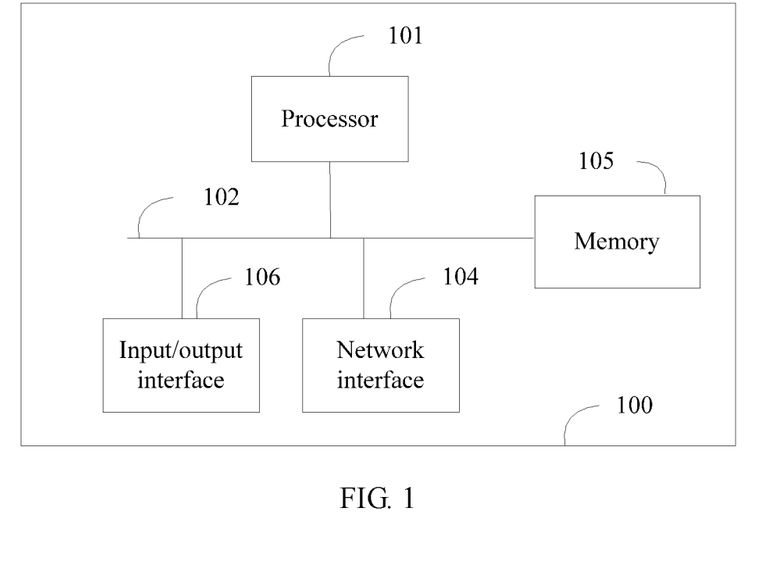
FIG. 1 is a simplified block diagram of a computer.

The sequence conversion method provided in the embodiments of the present disclosure may be implemented by a computer, and specifically, may be implemented by a general-purpose computer or a special-purpose computer, or may be implemented by a computer cluster, or certainly, may be implemented by a cloud. It can be understood that regardless of which manner is used for the implementation, it may be considered that the method is implemented by a computer. FIG. 1 depicts a structure of a computer 100, which includes at least one processor 101, at least one network interface 104, a memory 105, and at least one communication bus 102 providing connection and communication functions between components of the computer. The processor 101 is configured to execute a program module stored in the memory 105, to implement the sequence conversion method provided in embodiments of the present disclosure. The program module may be a computer program. According to roles of the computer 100 in a system and application scenarios of the sequence conversion method, the computer 100 may further include at least one input/output interface 106.

The type of the input/output interface 106 may vary with the application scenarios of the sequence conversion method. For example, when the sequence conversion method is to be used in machine translation, if a natural language content is entered by a user using a manual input device such as a keyboard, a mouse, a touchscreen, or a handwriting tablet, the input/output interface 106 needs to include an interface for communicating with the manual input device. If an output natural language content is directly presented by a display, the input/output interface 106 needs to include an interface for communicating with the display.

When the sequence conversion method is used in speech recognition, if human speech content is collected and then entered by a sound collection device such as a microphone, the input/output interface 106 needs to include an interface for communicating with the sound collection device. If output natural language text is directly presented by a display, the input/output interface 106 needs to include an interface for communicating with the display.

When the sequence conversion method is used in a dialog system, if human speech content is collected and then entered by a sound collection device such as a microphone, the input/output interface 106 needs to include an interface for communicating with the sound collection device. If an output speech response is directly presented by a voice play device such as a speaker, the input/output interface 106 needs to include an interface for communicating with the voice play device.

When the sequence conversion method is used in question answering, if human speech content is collected and then entered by a sound collection device such as a microphone, the input/output interface 106 needs to include an interface for communicating with the sound collection device. If an output speech response is directly presented by a voice play device such as a speaker, the input/output interface 106 needs to include an interface for communicating with the voice play device.

When the sequence conversion method is used in automatic summarization, if a paragraph of natural language text is entered by a user by using a manual input device such as a keyboard, a mouse, a touchscreen, or a handwriting tablet, the input/output interface 106 needs to include an interface for communicating with the manual input device. If a paragraph of natural language text is recognized and entered by an OCR module, the input/output interface 106 needs to include an interface for communicating with the OCR module. If an output summary is directly presented by a display, the input/output interface 106 needs to include an interface for communicating with the display.

When the sequence conversion method is used in image caption generation, if an image is collected and entered by an image capture device such as a camera, the input/output interface 106 needs to include an interface for communicating with the image capture device. If an output caption is directly presented by a display, the input/output interface 106 needs to include an interface for communicating with the display.

Figure 2:
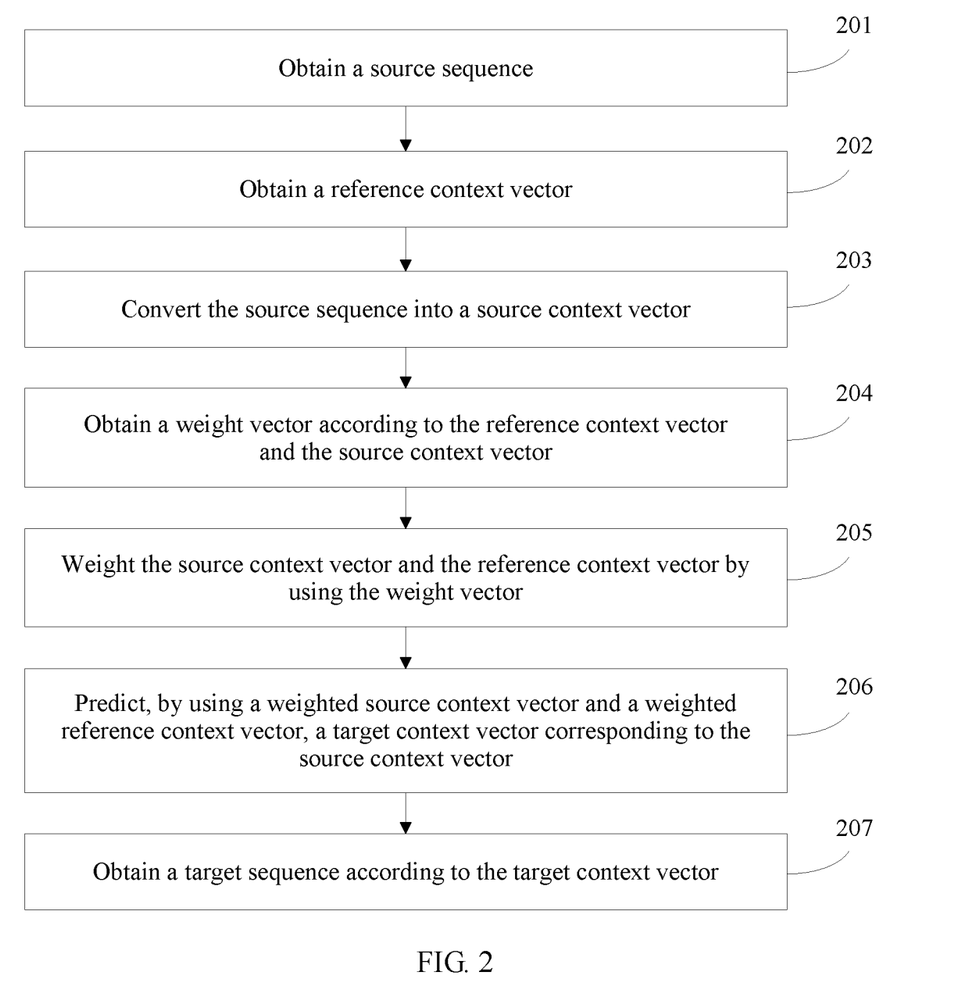
FIG. 2 is a flowchart of a sequence conversion method according to an embodiment of the present disclosure.

In the following, the sequence conversion method provided in the embodiments of the present disclosure will be described. FIG. 2 is a flowchart of a sequence conversion method according to an embodiment of the present disclosure. As shown in FIG. 2, the method includes the following steps.

201. Obtaining a source sequence.

The source sequence varies with application scenarios. For example, when the method is used in machine translation, the source sequence is natural language text, and may be a phrase, a sentence, or a paragraph. When the method is used in speech recognition, the source sequence is a section of human speech content. When the method is used in a dialog system, the source sequence is a section of human speech content. When the method is used in question answering, the source sequence is a section of human speech content. When the method is used in automatic summarization, the source sequence is a piece of to-be-summarized natural language text. When the method is used in image caption generation, the source sequence is an image for which a caption is to be generated.

Specific manners of obtaining the source sequence have been described in paragraphs above, and details are not described herein again.

202. Obtaining a reference context vector.

The reference context vector is used for predicting a current to-be-predicted target context vector. The reference context vector may be a target context vector obtained by means of prediction. For example, the target context vector may be a previous target context vector already obtained by prediction, or may be multiple target context vectors obtained by prediction. When there is no target context vector which is already obtained by prediction, an initialized vector may be used as the reference context vector. In an implementation of the present disclosure, value of each element in the initialized vector is zero. The reference context vector may specifically include a word vector and an intermediate state.

203. Converting the source sequence into a source context vector.

Specifically, an encoder converts the source sequence into a source context vector. For example, the source sequence may be converted into a vector sequence by using an RNN, and then the last vector in the vector sequence is used as a source context vector. Alternatively, using an attention mechanism, all vectors in the vector sequence are summarized into a source context vector in a weighted summation manner at different decoding moments as required. Alternatively, the source sequence may be summarized into a source context vector by using a convolutional neural network.

When an application scenario is machine translation, the source sequence may be converted into a source context vector in a word vector manner. A word vector is an expression in which a meaning of each word is automatically learned according to a context by learning a large amount of text (no notation is required), and then each word is mapped into a compact real number form. For example, vec (China) minus vec (Beijing) is approximately equal to vec (England) minus vec (London). Based on the word vector, one sentence may be mapped to one vector, and even one paragraph may be mapped to one vector by means of expansion.

It can be understood that when the application scenario is not the machine translation, the source sequence may be converted into a source context vector in a manner similar to the word vector.

It can be understood that step 203 is performed after step 201, but there is no particular order for performing the step 202 and the steps 201 and 203. For example, step 202 may be performed after steps 201 and 203.

204. Obtaining a weight vector according to the reference context vector and the source context vector.

Specifically, relative importance of the reference context vector and the source context vector may be determined according to the reference context vector and the source context vector, so as to obtain the weight vector according to the determined relative importance.

Dimensions of the obtained weight vector may be the same as dimensions of a target context vector, and the dimensions of the obtained weight vector may also be the same as dimensions of the source context vector. When the obtained weight vector is one-dimensional, the dimensions of the weight vector may also be different from those of the source context vector and the target context vector. Each element in the weight vector is a real number greater than zero and less than one. A quantity of dimensions indicates a quantity of elements in a vector. For example, if a vector is five-dimensional, it indicates that the vector includes five elements.

It can be understood that for different sequence conversion requirements, a value of a weight in the weight vector is different. For example, when the application scenario is the machine translation, for a notional word (that is, a word that has an actual meaning), a weight of a source context vector may be increased. For a function word (that is, a word that has no actual meaning, for example, a conjunction or a preposition), a weight of a target context vector may be increased.

205. Weighting the source context vector and the reference context vector by using the weight vector.

Dimensions of the source context vector are not necessarily the same as dimensions of the reference context vector (generally, the dimensions of the source context vector are higher than the dimensions of the reference context vector). Therefore, when the source context vector and the reference context vector are weighted by using the obtained weight vector, matrix conversion may be first performed on at least one of the weight vector, the source context vector, or the reference context vector. Therefore, the dimensions of the weight vector, the source context vector, and the reference context vector are consistent before weighting is performed. In this way, it can be ensured that each element in the source context vector and the reference context vector has a corresponding weight, and accuracy of a final prediction result is ensured.

Further, in some embodiments of the present disclosure, only one of the source context vector or the reference context vector may be weighted by using the weight vector.

In embodiments of the present disclosure, the source context vector and the reference context vector may be weighted by using a linear interpolation method.

206. Predicting, by using a weighted source context vector and a weighted reference context vector, a target context vector corresponding to the source context vector.

An expression form of a target context vector varies with an expression form of a target sequence. For example, when the target sequence is a natural language sequence, the expression form of the target context vector may be a word vector, and is corresponding to one target word or one group of target words.

A specific prediction process varies with an application scenario, and a corresponding mainstream general technology may be used in each application scenario. A specific prediction method is not limited in the present disclosure.

In specific implementations, the process of steps 202 to 206 may need to be performed for multiple times. A specific quantity of execution times is related to a quantity of source context vectors that are determined in a vector sequence. Steps 202 to 206 need to be performed once for each source context vector. Therefore, steps 202 to 206 need to be performed for a quantity of times that is the same as the quantity of the source context vectors that are determined in the vector sequence.

In an embodiment of the present disclosure, a reference context vector is a target context vector that is already obtained by means of prediction. Therefore, after a target context vector corresponding to a current source context vector is obtained by means of prediction, the reference context vector may be updated by using the target context vector that is corresponding to the current source context vector and that is obtained by means of prediction. Specifically, when the reference context vector is a previous target context vector already obtained by means of prediction, a next target context vector is directly predicted by using the target context vector that is corresponding to the current source context vector and that is obtained by means of prediction. When the reference context vector is multiple target context vectors already obtained by means of prediction, a target context vector that is earliest obtained by means of prediction in the multiple target context vectors may be replaced with the target context vector that is corresponding to the current source context vector and that is obtained by means of prediction.

207. Obtaining a target sequence according to the target context vectors.

Specific obtaining processes vary with application scenarios, and a corresponding mainstream general technology may be used in each application scenario. A specific obtaining method is not limited in the present disclosure.

After all target context vectors, which correspond to all source context vectors obtained after splitting the source sequence, are obtained by means of prediction, the target sequence may be obtained according to all of the obtained target context vectors.

It can be learned from the foregoing that, during sequence conversion, a weight vector is obtained according to the reference context vector and the source context vector. The source context vector and the reference context vector are weighted by using the weight vector, so that the target context vector corresponding to the source context vector is predicated by using the weighted source context vector and the weighted reference context vector. Therefore, weights of the source context vector and the reference context vector can be dynamically determined according to a status of the source sequence, so that the target context vector obtained by means of prediction can be more faithful to the source context vector, and the final target sequence can be more faithful to the source sequence. Faithfulness of the target sequence to the source sequence is improved while smoothness of the target sequence is ensured.

The following describes how to obtain the weight vector according to the reference context vector and the source context vector. In an implementation, the weight vector may be obtained by using a regression function. In another implementation, the weight vector may be obtained by using a neuron.

A neuron is a simplest neural network, and the neural network is a research hotspot that has emerged in the field of artificial intelligence since the 1980s. The neural network abstracts a human brain neuron network from a perspective of information processing, to establish a simple model and form different networks in different connection manners. The neural network is a mathematical operation model, and is constituted by a large quantity of interconnected neurons (nodes). Each node represents a specific output function that is referred to as an activation function. Every connection between two nodes represents a weight value for a signal passing through the connection, and the weight value is referred to as a weight. This is equivalent to memories of an artificial neural network. Network output varies with a connection manner, a weight value, and an activation function of a network.

Figure 3:
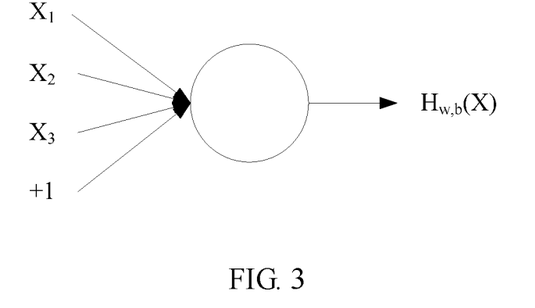
FIG. 3 is a schematic diagram of a neuron according to the present disclosure.

FIG. 3 shows schematically a structure of a neuron. The neuron is an operation unit with $X_1$, $X_2$, $X_3$, and an intercept+1 as input values. A specific expression form of the neuron may be an activation function. For example, output of the neuron shown in FIG. 3 may be expressed in the following form:

$$h_{W,b}(x) = f(W^T x) = f(\Sigma_{i=1}^3 W_i x_i + b)$$

where $W_i$ is a weight vector, b is a bias unit, and a function f is an activation function. In some implementations, the activation function may be a sigmoid function. A typical expression form of the sigmoid function is as follows:

$$f(z) = \frac{1}{1 + \exp(-z)}$$

In sequence-to-sequence conversion used in natural language processing, neither length of source sequence nor length of target sequence is fixed. In an embodiment of the present disclosure, a lengthened source sequence and a lengthened target sequence are processed by using a recurrent neural network (RNN). A main idea of the RNN is to recurrently compress an input sequence into a vector of fixed dimensions, and the vector of the fixed dimensions is also referred to as an intermediate state. Specifically, the RNN recurrently reads input sequences, calculates, according to a current source context vector and a previous intermediate state, an intermediate state corresponding to the current source context vector, and then predicts, according to the current intermediate state and the current source context vector, a target context vector corresponding to the current source context vector. In an embodiment of the present disclosure, alternatively, an intermediate state corresponding to a current source context vector may further be calculated by using the current source context vector, a previous intermediate state, and a previous target context vector. Then, a target context vector corresponding to the current source context vector is predicted according to the current intermediate state, the current source context vector, and the previous target context vector.

In an embodiment of the present disclosure, the weight vector is obtained by using a neuron, and is specifically obtained by using the following equation:

$$z_i = \sigma(W_z e(y_{i-1}) + U_z s_{i-1} + C_z c_i)$$

where $z_i$ is the weight vector, σ is an activation function, $e(y_{i-1})$ is a word vector in the reference context vector, $s_{i-1}$ is an intermediate state in the reference context vector, $c_i$ is the source context vector, $W_z$, $U_z$, and $C_z$ are module parameters of the activation function σ, and i represents a sequence number of a vector. Specifically, the module parameters $W_z$, $U_z$, and $C_z$ of the activation function σ may be obtained by learning from training data, and may be specifically obtained by maximizing a likelihood value of a target sequence in the training data. A specific expression form of the training data may be a training sequence pair. The activation function σ may be a sigmoid function used by the neuron. A sequence number of a vector indicates a position of the vector in a corresponding sequence. For example, when the vector is a source context vector, a sequence number of the source context vector indicates a position of the source context vector to participate in sequence conversion in multiple source context vectors obtained by converting a source sequence. For example, when the vector is a target context vector, a sequence number of the target context vector indicates a position of the target context vector in the target context vectors obtained by means of conversion during sequence conversion. A sequence number of a vector can be corresponding to a moment of sequence conversion. The module parameters $W_z$, $U_z$, and $C_z$ are used for controlling responses of the weight vector to $e(y_{i-1})$, $s_{i-1}$, and $c_i$, and different weight vectors can be output according to different values of $e(y_{i-1})$, $s_{i-1}$, and $c_i$.

In some embodiments of the present disclosure, the module parameters $W_z$, $U_z$, and $C_z$ of the activation function σ may be obtained by maximizing a likelihood value of a target sequence in a training sequence pair, and for example, may be specifically obtained by training using the following training function:

$$\underset{W_z, U_z, C_z, P}{\mathrm{argmax}} \sum_{n=1}^{N} \log p(Y_n | X_n)$$

where N is a quantity of training sequence pairs in a training sequence set, $X_n$ is a source sequence in a training sequence pair, $Y_n$ is a target sequence in a training sequence pair, and P is a parameter of a sequence conversion apparatus (which may be specifically implemented by using a neuron). The sequence conversion apparatus may control a response of $Y_n$ to $X_n$ by using the parameter P. Correspondingly, an objective of the control is to maximize the response of $Y_n$ to $X_n$, that is, to maximize a probability of $P(Y_n | X_n)$. For example, when the application scenario is the machine translation, an element in the training sequence set is a training sequence pair, and each training sequence pair is a pair of natural language sentences that are translations of each other.

In some embodiments of the present disclosure, the target context vector corresponding to the source context vector may be predicted by using a neuron. In a specific embodiment, the target context vector corresponding to the source context vector is obtained by means of prediction by using the following equation:

$$s_i = f((1-z_i)\{We(y_{i-1}) + Us_{i-1}\} + z_i C c_i)$$

where $s_i$ is the target context vector corresponding to the source context vector, f is an activation function, $e(y_{i-1})$ is the word vector in the reference context vector, $s_{i-1}$ is the intermediate state in the reference context vector, $z_i$ is the weight vector, $c_i$ is the source context vector, W, U, and C are module parameters of the activation function f, and i represents a sequence number of a vector. A larger value of $z_i$ indicates a larger weight of the source context vector, and on the contrary, a smaller value of $z_i$ indicates a larger weight of the target context vector. The activation function f may be a sigmoid function used by the neuron.

$s_i$ is obtained by using the activation function f, and input of the activation function f is the weighted source context vector and the weighted target context vector. The following describes how to weight the source context vector and the target context vector by using a specific example.

It is assumed that $e(y_{i-1})$ is a three-dimensional vector (−0.5, 0.2, 0.7), $s_{i-1}$ is a four-dimensional vector (−0.2, 0.5, 0.3, 0.8), $c_i$ is an eight-dimensional vector (0.3, 0.4, −0.5, 0.2, −0.8, −0.3, 0.5, 0.9), a module parameter W is a 4*3 matrix, a module parameter U is a 4*4 matrix, a module parameter C is a 4*8 matrix, and We($y_{i-1}$), and C$c_i$ are converted into four-dimensional vectors after matrix conversion. It is assumed that We($y_{i-1}$) is (0.1, 0.3, −0.2, 0.5), Us$_{i-1}$ is (0.7, 0.2, −0.4, 0.3), Cc$_i$ is (−0.2, 0.5, 0.2, 0.8), and (1−$z_i$){We($y_{i-1}$)+Us$_{i-1}$} is {1−(0.8, 0.5, 0.7, 0.4)}*{(0.1, 0.3, −0.2, 0.5)+(0.7, 0.2, −0.4, 0.3)}=(0.2, 0.5, 0.3, 0.6)*(0.8, 0.5, −0.6, 0.8)=(0.16, 0.25, −0.18, 0.48). Correspondingly, $z_i$Cc$_i$ is (0.8, 0.5, 0.7, 0.4)*(−0.2, 0.5, 0.2, 0.8)=(−0.16, 0.25, 0.14, 0.32).

The foregoing describes the sequence conversion method provided in the embodiments of the present disclosure in details. To verify validity of the sequence conversion method provided in the embodiments of the present disclosure, a test is performed on the sequence conversion method when the application scenario is the machine translation, to test accuracy of translating Chinese into English. For fairness of the test, a prior art process and the process according to the present disclosure are both implemented in a neural network. A standard neural machine translation (NMT) system is used as the prior art. Test results of the present disclosure are obtained by implementing solutions of the present disclosure based on the NMT.

A first group of test results is listed in the following Table 1.

TABLE 1

| Source in Chinese | 同车的巴基斯坦司机也遇害。 |
| --- | --- |
| Reference translation | The Pakistani driver in the same car was also killed. |
| Translation in the prior art | Pakistani driver also killed the car. |
| Translation in the present disclosure | The Pakistani driver was also killed. |

It can be learned from Table 1 that, in the standard NMT, "the driver in the car was also killed" was wrongly translated into "the driver killed the car", and this mistake was avoided in the translation manner according to the present disclosure.

A second group of test results is listed in the following Table 2.

TABLE 2

| Source in Chinese | 多个机场都被迫关闭了。 |
| --- | --- |
| Reference translation | Many airports were forced to shut down. |
| Translation in the prior art | Many airports were closed to close. |
| Translation in the present disclosure | Several airports were forced to closure. |

It can be learned from Table 2 that, in the standard NMT, "forced to" is not translated, and "closed/close" are repeatedly translated, and these mistakes are avoided in the translation manner according to the present disclosure.

A third group of test results is listed in the following Table 3.

TABLE 3

| Source in Chinese | 周六正是英国民众到超市采购的高峰时刻,当时 14 家超市的关闭令英国这家最大的连锁超市损失数百万英镑 在销售收入。 |
| --- | --- |
| Reference translation | Saturday is the peak period when British public shop at supermarkets. The closure of the 14 supermarkets at that time costs the largest supermarket chain in Britain several millions of British pounds in loss of sales. |
| Translation in the prior art | Twenty-six London supermarkets were closed at a peak hour of the British population in the same period of time. |
| Translation in the present disclosure | Saturday is the peak season of British people's purchases of the supermarket. At that time, the closure of 14 supermarkets made the biggest supermarket of British losing millions of pounds of sales income. |

It can be learned from Table 3 that meaning of a source sequence is basically missed in the standard NMT because the source sequence is excessively long, and faithfulness is extremely low. Faithfulness is greatly improved with the translation manner according to the present disclosure, and translation quality is significantly improved.

To further reflect an advantage of the present disclosure, the translation in the NMT and the translation in the present disclosure are scored by using a Bilingual Evaluation Understudy (BLEU) standard. A BLEU score of the translation in the NMT is 28.3, and a BLEU score of the translation in the present disclosure is 30.6. Compared with the translation in the NMT, the BLEU score of the translation in the present disclosure is improved by 2.3 BLEU scores, and translation quality is significantly improved.

It should be noted that, for briefness of description, the foregoing method embodiments are described as a series of actions. However, the present disclosure is not limited to the described order of the actions, because according to the present disclosure, some steps may be performed in other orders or simultaneously. In addition, the embodiments described in the specification are part of the embodiments, and the related actions and modules are not necessarily mandatory to the present disclosure.

Figure 4:
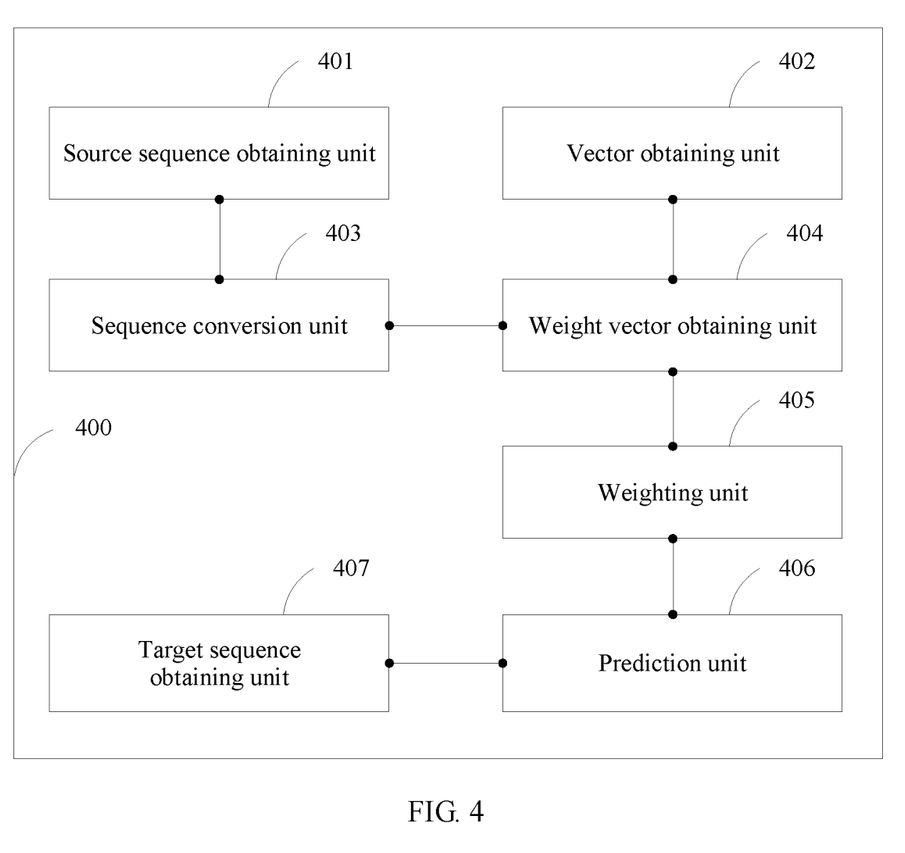
FIG. 4 is a functional block diagram of a sequence conversion apparatus according to an embodiment of the present disclosure.

FIG. 4 depicts a functional structure of a sequence conversion apparatus 400 according to an embodiment of the present disclosure. As shown in FIG. 4, the sequence conversion apparatus 400 includes a source sequence obtaining unit 401, a vector obtaining unit 402, a sequence conversion unit 403, a weight vector obtaining unit 404, a weighting unit 405, a prediction unit 406, and a target sequence obtaining unit 407.

The source sequence obtaining unit 401 is configured to obtain a source sequence. For a specific implementation, refer to description in step 201. Details are not described herein again.

The vector obtaining unit 402 is configured to obtain a reference context vector. For a specific implementation, refer to description in step 202. Details are not described herein again.

The sequence conversion unit 403 is configured to convert the source sequence into a source context vector. For a specific implementation, refer to description in step 203. Details are not described herein again.

The weight vector obtaining unit 404 is configured to obtain a weight vector according to the reference context vector and the source context vector. For a specific implementation, refer to description in step 204. Details are not described herein again.

The weighting unit 405 is configured to weight the source context vector and the reference context vector by using the weight vector. For a specific implementation, refer to description in step 205. Details are not described herein again.

The prediction unit 406 is configured to predict, by using a weighted source context vector and a weighted reference context vector, a target context vector corresponding to the source context vector. For a specific implementation, refer to description in step 206. Details are not described herein again.

The target sequence obtaining unit 407 is configured to obtain a target sequence according to the target context vector. For a specific implementation, refer to description in step 207. Details are not described herein again.

When the target context vector is the first target context vector corresponding to the source sequence, the reference context vector is an initial target context vector; or when the target context vector is not the first target context vector corresponding to the source sequence, the reference context vector is an obtained target context vector. The first target context vector corresponding to the source sequence is a target context vector corresponding to a source context vector that is first converted in multiple source context vectors corresponding to the source sequence.

Figure 5:
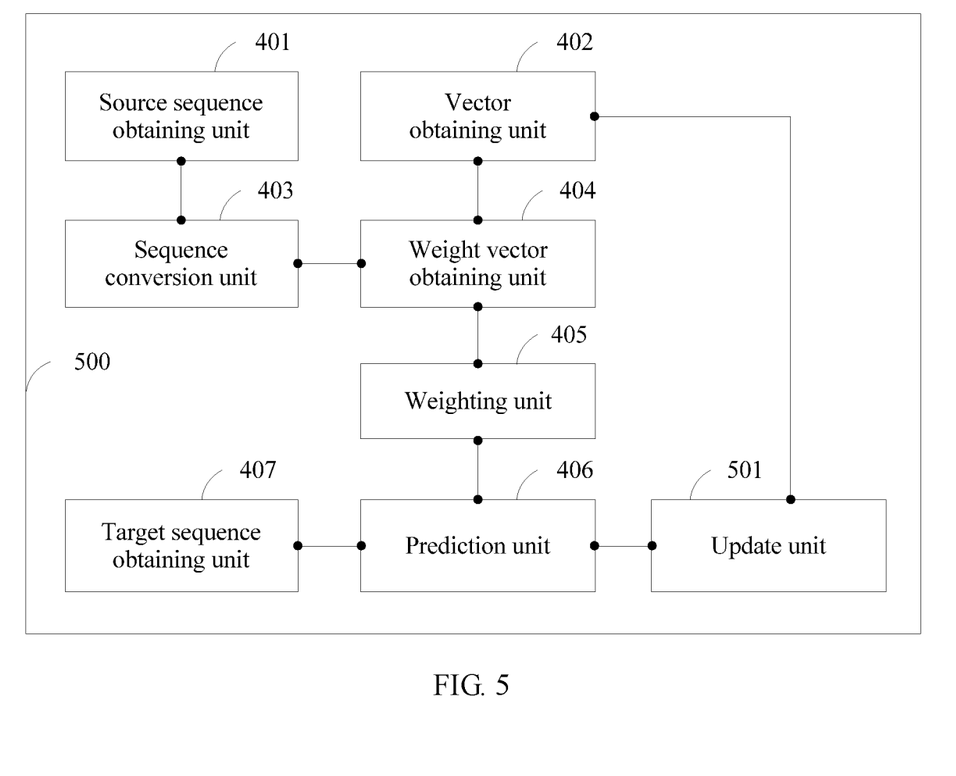
FIG. 5 is a functional block diagram of a sequence conversion apparatus according to another embodiment of the present disclosure.

FIG. 5 depicts a functional structure of a sequence conversion apparatus 500 according to another embodiment of the present disclosure. Compared with the sequence conversion apparatus 400 depicted in FIG. 4, an update unit 501 is added to the sequence conversion apparatus 500 depicted in FIG. 5. The update unit 501 is configured to update the reference context vector by using the target context vector corresponding to the source context vector. The vector obtaining unit 402 may obtain an updated reference context vector and predict a next target context vector. For an implementation of the source sequence obtaining unit 401, the vector obtaining unit 402, the sequence conversion unit 403, the weight vector obtaining unit 404, the weighting unit 405, the prediction unit 406, and the target sequence obtaining unit 407, refer to the description above, and details are not described again.

In an embodiment of the present disclosure, the weight vector obtaining unit 404 may obtain the weight vector by using the following equation:

$$z_i = \sigma(W_z e(y_{i-1}) + U_z s_{i-1} + C_z c_i)$$

where $z_i$ is the weight vector, $\sigma$ is an activation function, $e(y_{i-1})$ is a word vector in the reference context vector, $s_{i-1}$ is an intermediate state in the reference context vector, $c_i$ is the source context vector, $W_z$, $U_z$, and $C_z$ are module parameters of the activation function $\sigma$, and i represents a sequence number of a vector. The module parameters $W_z$, $U_z$, and $C_z$ are obtained by learning from training data, and may be specifically obtained by maximizing a likelihood value of a target sequence in the training data. A specific expression form of the training data may be a training sequence pair.

In an embodiment of the present disclosure, the weight vector obtaining unit 404 may be implemented by using a neuron. For example, the activation function $\sigma$ may be a neuron. Certainly, the weight vector obtaining unit 404 may also be a neuron.

Figure 6:
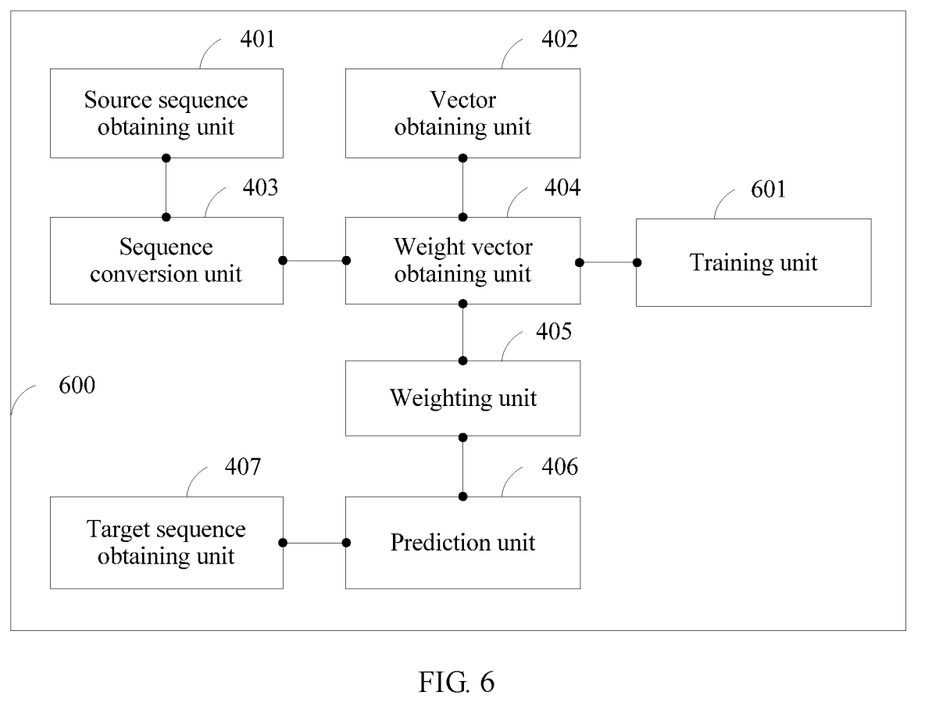
FIG. 6 is a functional block diagram of a sequence conversion apparatus according to another embodiment of the present disclosure.

FIG. 6 depicts a functional structure of a sequence conversion apparatus 600 according to another embodiment of the present disclosure. Compared with the sequence conversion apparatus 400 depicted in FIG. 4, a training unit 601 is added to the sequence conversion apparatus 600 depicted in FIG. 6. The training unit 601 is configured to obtain the module parameters $W_z$, $U_z$, and $C_z$ by maximizing a likelihood value of a target sequence in a training sequence pair, and specifically obtain the module parameters by using the following training function:

$$\underset{W_z, U_z, C_z, P}{\operatorname{argmax}} \sum_{n=1}^{N} \log p(Y_n \mid X_n)$$

where N is a quantity of training sequence pairs in a training sequence set, $X_n$ is a source sequence in a training sequence pair, $Y_n$ is a target sequence in a training sequence pair, and P is a parameter of the training unit 601. When the training unit 601 is implemented by using a neuron, P is a parameter of the neuron. The module parameters obtained by training by the training unit 601 may be provided to the weight vector obtaining unit 404, and the weight vector obtaining unit 404 may obtain a weight vector by using the module parameters provided by the training unit 601.

For an implementation of the source sequence obtaining unit 401, the vector obtaining unit 402, the sequence conversion unit 403, the weight vector obtaining unit 404, the weighting unit 405, the prediction unit 406, and the target sequence obtaining unit 407, refer to the description above, and details are not described again.

In an embodiment, dimensions of the weight vector are the same as dimensions of the target context vector. In some embodiments of the present disclosure, the dimensions of the weight vector may be the same as dimensions of the source context vector. In some other embodiments, the dimensions of the weight vector may also be different from those of the source context vector and the target context vector. When the dimensions of the weight vector are different from those of the source context vector or the target context vector, dimensions of the weight vector, the source context vector, and the reference context vector may be made consistent in a matrix conversion manner before weighting is performed. Therefore, it can be ensured that each element in the source context vector and the reference context vector has a corresponding weight, and accuracy of a final prediction result is ensured. Each element in the weight vector is a real number greater than 0 and less than 1.

In an embodiment, the prediction unit 406 may obtain, by means of prediction by using the following equation, the target context vector corresponding to the source context vector:

$$s_i = f((1-z_i)\{W e(y_{i-1}) + U s_{i-1}\} + z_i C c_i)$$

where $s_i$ is the target context vector corresponding to the source context vector, f is an activation function, $e(y_{i-1})$ is the word vector in the reference context vector, $s_{i-1}$ is the intermediate state in the reference context vector, $z_i$ is the weight vector, $c_i$ is the source context vector, W, U, and C are module parameters of the activation function f, i represents a sequence number of a vector, and the activation function f may be a sigmoid function used by a neuron.

Figure 7:
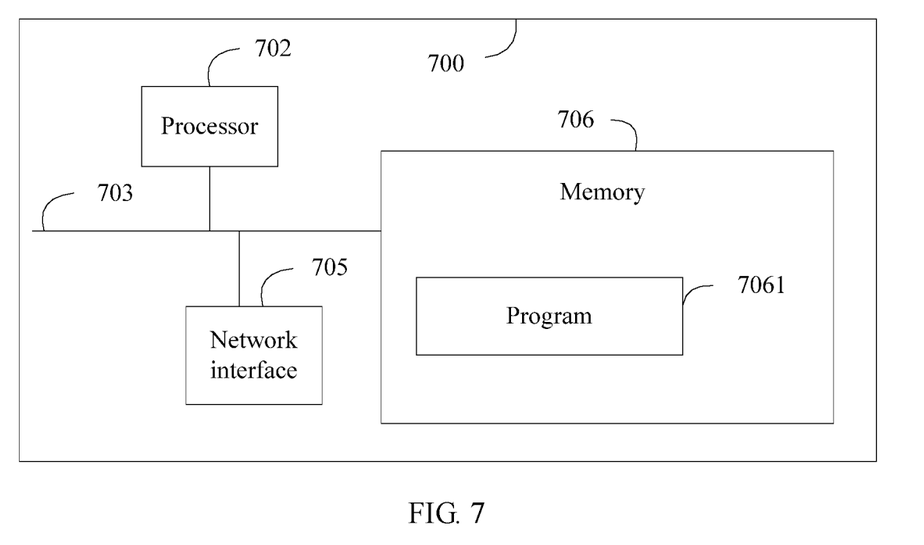
FIG. 7 is a simplified structural block diagram of a sequence conversion apparatus according to another embodiment of the present disclosure.

FIG. 7 depicts a structure of a sequence conversion apparatus 700 according to another embodiment of the present disclosure. The conversion apparatus includes at least one processor 702 (for example, a central processing unit (CPU)), at least one network interface 705 or other communications interface, a memory 706, and at least one communications bus 703 configured to implement connection and communication between these apparatuses. The processor 702 is configured to execute an executable module, such as a computer program, stored in the memory 706. The memory 706 may include a high-speed random access memory (RAM), or may further include a non-volatile memory such as at least one magnetic disk memory. Communication connection between a system gateway and at least one other network element is implemented by using the at least one network interface 705 (which may be wired or wireless), for example, the Internet, a wide area network, a local area network, or a metropolitan area network may be used.

In some implementations, a program 7061 is stored in the memory 706, and the program 7061 may be executed by the processor 702. The sequence conversion method provided in the present disclosure may be executed when the program is executed.

In an embodiment of the present disclosure, when the sequence conversion method/apparatus is applied to machine translation, a source sequence is natural language text, and a target sequence is another natural language text.

When the sequence conversion method/apparatus is applied to speech recognition, a source sequence is human speech content, and a target sequence is natural language text corresponding to the speech content.

When the sequence conversion method/apparatus is applied to a dialog system, a source sequence is human speech content, and a target sequence is a speech response to the human speech content.

When the sequence conversion method/apparatus is applied to automatic summarization, a source sequence is to-be-summarized natural language text, a target sequence is a summary of the to-be-summarized natural language text, and the summary is natural language text.

When the sequence conversion method/apparatus is applied to image caption generation, a source sequence is an image, and a target sequence is a natural language caption of the image.

According to the sequence conversion apparatus provided in this embodiment of the present disclosure, during sequence conversion, the weight vector is obtained according to the reference context vector and the source context vector. The source context vector and the reference context vector are weighted by using the weight vector, so that the target context vector corresponding to the source context vector is predicated by using the weighted source context vector and the weighted reference context vector. Therefore, weights of the source context vector and the reference context vector can be dynamically determined according to a status of the source sequence, so that the target context vector obtained by means of prediction can be more faithful to the source context vector, and the final target sequence can be more faithful to the source sequence. Faithfulness of the target sequence to the source sequence is improved while smoothness of the target sequence is ensured.

Content such as an information exchange and an execution process between the modules in the apparatus and the system is based on a same idea as the method embodiments of the present disclosure. Therefore, for detailed content, refer to descriptions in the method embodiments of the present disclosure, and details are not described herein again.

All or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a RAM.

Specific examples are used in this specification to describe the principle and implementations of the present disclosure. The descriptions of the foregoing embodiments are merely intended to help understand the method and idea of the present disclosure. In addition, with respect to the implementations and the application scope, modifications may be made according to the idea of the present disclosure. Therefore, this specification shall not be construed as a limitation on the present disclosure.

What is claimed is:

1. A method for converting a source sequence to a target sequence, performed by a computing device, wherein the source sequence and the target sequence are representations of natural language contents, the method comprising:
    obtaining the source sequence from an input signal;
    converting the source sequence into one or more source context vectors;
    obtaining one or more target context vectors corresponding to one the one or more source context vectors;
    combining the obtained one or more target context vectors to obtain the target sequence; and
    outputting the target sequence,
wherein obtaining each one or more target context vectors corresponding to one of the one or more source context vectors comprises:
    obtaining a reference context vector corresponding to the target context vector;
    obtaining a weight vector according to the source context vector corresponding to the target context vector and the reference context vector;
    weighting the source context vector and the reference context vector by using the weight vector, to obtain a weighted source context vector and a weighted reference context vector; and
    predicting the target context vector using the weighted source context vector and the weighted reference context vector,
    wherein, when the source sequence represents national language text and the source context vector is a word vector converted from the natural language text, a value of a weight in the weight vector is determined so that a weight of one or more elements in the source context vector that are converted from one or more notional words in the natural language in increased, or a weight of one or more elements in the target context vector that correspond to one or more function words in the natural language text is increased.

2. The method according to claim 1, wherein the one or more target context vectors are predicted sequentially, and wherein when a current source context vector is the $i^{th}$ source context vector of the source sequence, obtaining a weight vector $z_i$ according to the $i^{th}$ source context vector and the $i^{th}$ reference context vector comprises:
    obtaining the weight vector $z_i$ by using the following equation:

$$z_i = \sigma(W_z e(y_{i-1}) + U_z s_{i-1} + C_z c_i)$$

where $z_i$ is the weight vector, $\sigma$ is an activation function, $e(y_{i-1})$ is a word vector in the $i^{th}$ reference context vector, $s_{i-1}$ is an intermediate state in the $i^{th}$ reference context vector, $c_i$ is the $i^{th}$ source context vector, $W_z$, $U_z$, and $C_z$ are module parameters of the activation function $\sigma$, and i represents a sequence number of a vector.

3. The method according to claim 2, wherein the module parameters $W_z$, $U_z$, and $C_z$ are obtained by learning from training data.

4. The method according to claim 2, wherein the activation function is a sigmoid function $$f(z) = \frac{1}{1+\exp(-z)}.$$

5. The method according to claim 2, wherein the module parameters $W_z$, $U_z$, and $C_Z$ are obtained by way of maximizing a likelihood value of source sequence-target sequence training sequence pairs, and the module parameters are obtained using the following training function:

$$\underset{W_z, U_z, C_z, P}{\operatorname{argmax}} \sum_{n=1}^{N} \log p(Y_n \mid X_n),$$

where N is a quantity of training sequence pairs in a training sequence set, $X_n$ is a source sequence in a $n^{th}$ training sequence pair, $Y_n$ is a target sequence in the $n^{th}$ training sequence pair, P is a parameter of the computing device.

6. The method according to claim 1, wherein the one or more target context vectors are predicted sequentially, and wherein in obtaining the reference context vector,
when the target context vector to be predicted is a first target context vector of the target sequence, the corresponding reference context vector is an initial target context vector; and
when the target context vector to be predicted is not the first target context vector of the target sequence, the corresponding reference context vector comprises a previous target context vector corresponding to a previous source context vector.

7. The method according to claim 1, wherein, for each one or more target context vectors, a dimension of the weight vector obtained according to the corresponding source context vector and the corresponding reference context vector is the same as a dimension of the predicted target context vector.

8. The method according to claim 1, wherein each element in the weight vector is a real number greater than 0 and less than 1.

9. The method according to claim 1, wherein the one or more target context vectors are predicted sequentially, and wherein predicting the $i^{th}$ target context vector corresponding to the $i^{th}$ source context vector by using the $i^{th}$ weighted source context vector and the $i^{th}$ weighted reference context vector comprises:
obtaining the $i^{th}$ target context vector $s_i$ by using the following equation:

$$s_i = f((1-z_i)\{We(y_{i-1}) + Us_{i-1}\} + z_i C c_i)$$

where $s_i$ is the $i^{th}$ target context vector corresponding to the $i^{th}$ source context vector, $s_{i-1}$ is an activation function, $e(y_{i-1})$ is the word vector in the $i^{th}$ reference context vector, $s_{i-1}$ is an intermediate state in the $i^{th}$ reference context vector, $z_i$ is the weight vector, $c_i$ is the source context vector, W, U, and C are module parameters of the activation function f, and i represents a sequence number of a vector.

10. An apparatus, comprising a processor and a non-transitory storage medium storing program instructions for execution by the processor;
wherein the program instructions, when executed by the processor, cause the apparatus to perform a process of converting a source sequence to a target sequence, wherein the source sequence and the target sequence are representations of natural language contents, and the process comprises:
obtaining the source sequence from an input signal;
converting the source sequence into one or more source context vectors;
obtaining one or more target context vectors corresponding to one or more source context vectors;
combining the obtained one or more target context vectors to obtain the target sequence; and
outputting the target sequence,
wherein obtaining each one or more target context vectors corresponding to one of the one or more source context vectors comprises:
obtaining a reference context vector corresponding to the target context vector;
obtaining a weight vector according to the source context vector corresponding to the target context vector and the corresponding reference context vector;
weighting the source context vector and the reference context vector by using the weight vector, to obtain a weighted source context vector and a weighted reference context vector; and
predicting the target context vector by using the weighted source context vector and the weighted reference context vector,
wherein, when the source sequence represents national language text and the source context vector is a word vector converted from the natural language text, a value of a weight in the weight vector is determined so that a weight of one or more elements in the source context vector that are converted from one or more notional words in the natural language in increased, or a weight of one or more elements in the target context vector that correspond to one or more function words in the natural language text is increased.

11. The apparatus according to claim 10, wherein the one or more target context vectors are predicted sequentially, and wherein when a current source context vector is the $i^{th}$ source context vector of the source sequence, obtaining a weight vector $z_i$ according to the $i^{th}$ source context vector and the corresponding $i^{th}$ reference context vector comprises:
obtaining the weight vector $z_i$ by using the following equation:

$$z_i = \sigma(W_z e(y_{i-1}) + U_z s_{i-1} + C_z c_i)$$

where $z_i$ is the weight vector, $\sigma$ is an activation function, $e(y_{i-1})$ is a word vector in the $i^{th}$ reference context vector, $s_{i-1}$ is an intermediate state in the $i^{th}$ reference context vector, $c_i$ is the $i^{th}$ source context vector, $W_z$, $U_z$, and $C_z$ are module parameters of the activation function $\sigma$, and i represents a sequence number of a vector.

12. The apparatus according to claim 11, wherein the module parameters $W_z$, $U_z$, and $C_z$ are obtained by learning from training data.

13. The apparatus according to claim 11, wherein the activation function is a sigmoid function $$f(z) = \frac{1}{1+\exp(-z)}.$$

14. The apparatus according to claim 11, wherein the module parameters $W_z$, $U_z$, and $C_z$ are obtained by way of maximizing a likelihood value of source sequence-target sequence training sequence pairs, and the module parameters are obtained by using the following training function:

$$\underset{W_z,U_z,C_z,P}{\operatorname{argmax}} \sum_{n=1}^{N} \log p(Y_n \mid X_n)$$

where N is a quantity of training sequence pairs in a training sequence set, $X_n$ is a source sequence in a $n^{th}$ training sequence pair, $Y_n$ is a target sequence in the $n^{th}$ training sequence pair, and P is a parameter of the apparatus.

15. The apparatus according to claim 10, wherein the one or more target context vectors are predicted sequentially, and wherein in obtaining the reference context vector, when the target context vector to be predicted is a first target context vector of the target sequence, the corresponding reference context vector is an initial target context vector; and when the target context vector to be predicted is not the first target context vector of the target sequence, the corresponding reference context vector is a previous target context vector corresponding to a previous source context vector.

16. The apparatus according to claim 10, wherein, for each one or more target context vectors, a dimension of the weight vector obtained according to the corresponding source context vector and the corresponding reference context vector is the same as a dimension of the predicted target context vector.

17. The apparatus according to claim 10, wherein each element in the weight vector is a real number greater than 0 and less than 1.

18. The apparatus according to claim 10, wherein the one or more target context vectors are predicted sequentially, and wherein predicting the $i^{th}$ target context vector corresponding to the $i^{th}$ source context vector by using the $i^{th}$ weighted source context vector and the $i^{th}$ weighted reference context vector comprises:

obtaining the $i^{th}$ target context vector $s_i$ by using the following equation:

$$s_i = f((1-z_i)\{We(y_{i-1}) + Us_{i-1}\} + z_i Cc_i)$$

where $s_i$ is the $i^{th}$ target context vector corresponding to the $i^{th}$ source context vector, f is an activation function, $e(y_{i-1})$ is the word vector in the $i^{th}$ reference context vector, $s_{i-1}$ is an intermediate state in the $i^{th}$ reference context vector, $z_i$ is the weight vector, $c_i$ is the source context vector, W, U, and C are module parameters of the activation function f, and i represents a sequence number of a vector.

19. A non-transitory storage medium storing computer instructions that, when executed by one or more processors in a computing device, cause the computing device to perform a process of converting a source sequence to a target sequence, wherein the source sequence and the target sequence are representations of natural language contents, and wherein the process comprises:

obtaining the source sequence from an input signal;
converting the source sequence into one or more source context vectors;
obtaining one or more target context vectors corresponding to the one or more source context vectors;
combining the obtained one or more target context vectors to obtain the target sequence; and
outputting the target sequence,
wherein obtaining each of the one or more a target context vectors corresponding to one of the one or more source context vectors comprises:
obtaining a reference context vector corresponding to the target context vector;
obtaining a weight vector according to the source context vector corresponding to the target context vector and the corresponding reference context vector;
weighting the source context vector and the reference context vector by using the weight vector, to obtain a weighted source context vector and a weighted reference context vector; and
predicting the target context vector by using the weighted source context vector and the weighted reference context vector,
wherein, when the source sequence represents national language text and the source context vector is a word vector converted from the natural language text, a value of a weight in the weight vector is determined so that a weight of one or more elements in the source context vector that are converted from one or more notional words in the natural language in increased, or a weight of one or more elements in the target context vector that correspond to one or more function words in the natural language text is increased.

20. The non-transitory storage medium according to claim 19, wherein the one or more target context vectors are predicted sequentially, and wherein when a current source context vector is the $i^{th}$ source context vector of the source sequence, obtaining a weight vector $z_i$ according to the $i^{th}$ source context vector and the corresponding $i^{th}$ reference context vector comprises:

obtaining the weight vector $z_i$ by using the following equation:

$$z_i = \sigma(W_z e(y_{i-1}) + U_z s_{i-1} + C_z c_i)$$

where $z_i$ is the weight vector, $\sigma$ is an activation function, $e(y_{i-1})$ is a word vector in the $i^{th}$ reference context vector, $s_{i-1}$ is an intermediate state in the $i^{th}$ reference context vector, $c_i$ is the $i^{th}$ source context vector, $W_z$, $U_z$, and $C_z$ are module parameters of the activation function $\sigma$, and i represents a sequence number of a vector.

* * * * *

UNITED STATES PATENT AND TRADEMARK OFFICE
CERTIFICATE OF CORRECTION

PATENT NO. : 11,288,458 B2
APPLICATION NO. : 16/276627
DATED : March 29, 2022
INVENTOR(S) : Zhaopeng Tu It is certified that error appears in the above-identified patent and that said Letters Patent is hereby corrected as shown below:

In the Claims

Claim 1, at Column 22, Line 20, replace "each one or more" with "each of the one or more";

Claim 1, at Column 22, Line 32, replace "vector using" with "vector by using";

Claim 1, at Column 22, Line 41, replace "in increased" with "text is increased";

Claim 2, at Column 22, Line 56, replace "e($y_{i-1}$ i)" with "e($y_{i-1}$)";

Claim 7, at Column 23, Line 34, replace "for each one" with "for each of the one";

Claim 9, at Column 23, Line 55, replace "$s_{i-1}$" with "f";

Claim 10, at Column 24, Lines 7 and 8, replace "corresponding to one or more" with "corresponding to the one or more";

Claim 10, at Column 24, Line 12, replace "each one" with "each of the one";

Claim 10, at Column 24, Lines 34 and 35, replace "in increased" with "text is increased";

Claim 16, at Column 25, Lines 29 and 30, replace "for each one or more" with "for each of the one or more";

Claim 16, at Column 25, Lines 32 and 33, replace "the corresponding reference context" with "reference context";

Claim 19, at Column 26, Line 13, replace "one or more a target" with "one or more target"; and Claim 19, at Column 26, Line 34, replace "in increased" with "text is increased".

Signed and Sealed this
Twenty-sixth Day of April, 2022

Katherine Kelly Vidal
*Director of the United States Patent and Trademark Office*